United States Patent [19]

Hsu

[11] Patent Number: 4,808,419

[45] Date of Patent: Feb. 28, 1989

[54] AUTOMATED METHOD FOR A SEMI-SOLID FERMENTATION USED IN THE PRODUCTION OF ANCIENT QUALITY RICE VINEGAR AND/OR RICE WINE

[76] Inventor: Edward J. Hsu, 50 E. Concord Ave., Kansas City, Mo. 64112

[21] Appl. No.: 10,186

[22] Filed: Feb. 2, 1987

[51] Int. Cl.$^4$ .............................. C12G 1/00; C12J 1/02
[52] U.S. Cl. ........................................ 426/13; 426/11; 426/17; 426/29
[58] Field of Search .................... 426/7, 11, 17, 62, 13, 426/29, 592

[56] References Cited

U.S. PATENT DOCUMENTS

| | | | |
|---|---|---|---|
| 4,028,470 | 6/1977 | Hayashi et al. | 426/11 |
| 4,117,169 | 9/1978 | Noda et al. | 426/11 |
| 4,308,284 | 12/1981 | Noda et al. | 426/11 |
| 4,358,462 | 11/1982 | Takeda | 426/11 |

FOREIGN PATENT DOCUMENTS

| | | | |
|---|---|---|---|
| 0130387 | 7/1985 | Japan | 426/17 |
| 0168376 | 8/1985 | Japan | 426/17 |

*Primary Examiner*—Marianne Cintins

*Attorney, Agent, or Firm*—Hovey, Williams, Timmons & Collins

[57] ABSTRACT

A process for the preparation of rice wine or vinegar especially to an improved procedure for preparing a vinegar, having the attributes of ancient quality, labor intensive and multi-year jar prepared rice vinegar. A single, autoclave fermenter is used for carrying out process steps including rice washing, soaking, cooking, liquification and saccharification, in order to produce a rice vinegar mash that initially contains a minimum of 30% starch. Ethanol fermentation is also carries out in the same vessel at a relatively high temperature to yield a wine product with an ethanol concentration of at least 18% and an amino acid concentration of at least 1.0%. The relatively high amino acid content of the wine causes the subsequently produced vinegar to be exceptionally smooth and mild. The rice mash is prepared by mixing cooked rice with alpha-amylase, elevating the temperature to liquify the rice, and then raising the temperature to about 121° C. to more completely gelatinize, liquify and sterilize the rice; the mash is then cooled to about 85° C. and a second batch of alpha-amylase is added. *Aspergillus oryzae* grown on wheat to produce a wheat koji is employed to impart a distinct flavor, aroma and umani to the mash.

37 Claims, 2 Drawing Sheets

AUTOMATED METHOD FOR A SEMI-SOLID FERMENTATION USED IN THE PRODUCTION OF ANCIENT QUALITY RICE VINEGAR AND/OR RICE WINE

BACKGROUND OF THE INVENTION

1. Field of the Invention

This invention relates to a large scale process for the manufacture of rice wine and particularly a rice vinegar having the attributes of ancient jar prepared vinegar. A single autoclave, fermentation vessel is used to carry out process steps including washing and soaking, steam cooking, high temperature liquification, saccharification and fermentation until an ethanol concentration of 18% is reached, and the vessel includes bottom scrapers which ensure a more complete gelatinization, liquification and sterilization of the rice. Two strains of *Aspergillus oryzae* are grown on steamed wheat and utilized as a source of enzymes to provide a unique, characteristic flavor, aroma and umami to the mash. One preferred method step includes two separate additions of alpha-amylase to the mash to promote gelatinization and liquification and ensure that the mash has a starch content of at least 30%.

2. Description of the Prior Art

Vinegar, as the term is known today, may be prepared from almost any watery substance that contains sugar and other nutrients to provide an alcoholic fermentation which is followed by acetification. Primarily, vinegar is a dilute solution of acetic acid but may also include many unaltered soluble ingredients from which it is made as well as fermentation products other than acetic acid. Although vinegars can be prepared from any of several alcoholic products, the character, including the flavor and aroma, of any particular vinegar is dependent upon the character of the substance from which it is fermented.

In the United States, much of the better quality vinegar used is prepared from fermented apple juice; however, wine vinegar is manufactured in many of the wine-producing areas of the world and in some areas, popular vinegars are produced from the juices of pineapples, oranges, persimmons, plums and other fruits. Use of malt vinegars is widespread in countries such as England, while tea beverage vinegars are popular in certain areas including Indonesia and Russia.

Vinegar may be used for a number of various purposes. Oftentimes, vinegar is used without alteration or with addition of simple herbs as a condiment or dressing. Vinegars are also used extensively for the preparation of sauces such as ketchup, fruit sauces, savory sauces, mayonnaise and salad dressings. Vinegar is a main constituent of many relishes, chutneys and piccalilli. Furthermore, vinegar is of major importance to industry in the manufacture and processing of brined vegetables such as cauliflower, onions and the like and for making various types of pickles.

In ancient China, vinegars were mostly produced from rice, since rice was one of the major crops of the area. Many Orientals consume rice vinegar on a daily basis for health or medicinal reasons; in addition, it is used as an important ingredient for soft drinks, fruit juices, and other beverages as a substitute for citric acid. While rice vinegar may be inexpensively manufactured from rice wine residue or sake residue, there has been an increasing consumer preference for vinegar prepared from a rice mash which provides its own characteristic flavor, aroma, and umami, the latter word being a Japanese term roughly defined as an intensified flavor and aroma.

Virtually all flavors, including sourness, bitterness, sweetness and saltiness, are found in vinegar due to the many different kinds of flavor and odor molecules which are present. Chemical factors affecting the flavor of vinegar include types of nucleic acids and amino acids (including short peptides) which are present, while aroma is determined largely from fatty acids of varying chain lengths. The color of rice vinegar may be changed according to consumer preference by exposing the product to heat which functions to intensify the color.

In brief, the known methods for producing rice vinegar include the steps of saccharification of rice which is followed by alcoholic fermentation and then acetification. Additionally, a quantity of koji, or fermented grains, may be added to assist the saccharification process and enchance the flavor of the final product. The koji serves as a source of a number of enzymes that catalyze the degradation of rice to soluble products which provide the substrates for yeast and bacteria in the subsequent fermentation stages. Moreover, koji also produces a number of chemicals which impart a unique flavor and aroma to the finished product.

The traditional ancient method of preparing rice vinegar includes the initial step of polishing the rice with a light force to remove the hull and embryo so that the mycelia of the fungal cultures can easily penetrate and saccharify the rice. Next, the rice is washed to remove residual hulls and soaked in water of good quality. The rice is then steamed to convert starch in the rice into alpha-starch and denature the protein in the rice. The rice is steamed for one hour in a basket placed atop a pot or alternatively may be cooked on a conveyor which exposes the rice to a steam bath for 20 to 30 minutes. The cooked rice must then be cooled to about 20°–25° C. by use of a cooling machine or by manually spreading the rice on cloth for air cooling over an extended period of time.

Typically, koji is prepared by thoroughly mixing an inoculum of koji with steamed rice that is cooled to 30°–32° C. The mixture is spread on a bed in a thin layer, and air at about 32° C. and having a relative humidity of 90–94% is passed through the bed for 20 hours at which time the mixture is turned over. The temperature of the koji will continue to rise during additional fermentation which normally lasts 40 hours.

To begin production of alcohol, yeast inoculum is prepared in a large quantity and koji and steamed rice are typically added three times over a period of four to five days. This process is carried out in an open system without sterilization, and thus complicated techniques are implemented in an effort to discourage invading microorganisms such as wild yeasts and lactic acid bacteria. Fermentation of the rice and koji mash is carried out at an extremely low temperature in the range of 9°–11° C. over a period of 25 to 30 days and as a result is extremely labor intensive.

Typical Chinese vinegar factories even today employ 200 to 700 workers producing only 8000 gallons of vinegar per month. Furthermore, better quality rice vinegar requires at least two to six years to complete the fermentation and acetification of a marketable product.

An upgraded method which is currently in widespread use for preparation of a rice-vinegar mash has been developed whereby the liquification and saccharification of the rice, that is steamed separately outside a fermentor, is carried out utilizing commercially available alpha- and beta-amylases to obtain a rice mash that has a starch content of less than 18%. A small amount, on the order of 10%, of rice-koji may be added to facilitate the saccharification process and enhance the flavor of the final product. The rice mash is press filtered to obtain a clear filtrate to which baker's yeast is added to start ethanol fermentation. A concentration of 10% ethanol is produced during the process which is carried out at a relatively low temperature, in the range of 15°–20° C. The mash is then diluted approximately two times with the addition of food grade pure ethanol for a submerged oxidation of ethanol to acetic acid.

However, the widely used, upgraded method is subject to many shortcomings. Since the mash contains only approximately 10% ethanol, autolysis of the yeast cell is either completely absent or minimal unless the mash is allowed to stand for a few weeks. Unfortunately, putrification of the mash may occur when the mash stands for such a relatively long time. Secondly, due to the lack of proteolytic enzymes in the rice-koji, the amino acid content is extremely low, which adversely affects the flavor and aroma of the finished product.

Ancient Japanese and Chinese techniques are known which allow saccharification, alcoholic fermentation and acetification to be performed in a common vessel. The entire procedure is carried out as a solid fermentation, to permit an extremely high content of starch in the fermentation mash. The quality of the rice vinegar produced by such ancient methods is highly valuable due to the binding of amino acids to acetic acid which results in such a unique, mild, mellow, and smooth flavor that this vinegar can be used not only as a condiment but also as a drink or as an ingredient for a beverage.

In accordance with the Japanese technique, seed vinegar is sprayed on walls of an earthenware, glazed jar. Next, a layer of koji, a layer of steamed rice, and a second layer of koji are placed in the jar and the contents are allowed to ferment at 20°–28° C. for three to six months, often by placing the jars in an open field. Traditionally, a natural flora of yeasts and acetic acid bacteria are utilized, although the fermentation time and the amount of rice required may be reduced by substitution of pure cultures of microorganisms.

In accordance with the traditional Chinese process, a quantity of rice which has been separately steamed is put into glazed jars and koji is made of the cooked rice. Water is then added to complete saccharification of the rice, after which alcoholic fermentation followed by acetification are undertaken in the same vessel. Unfortunately the success rate is rather low because the natural flora, temperature and acidity are generally not controlled in this type of process. It has been suggested that the Chinese process could be improved by control of the temperature, use of pure cultures to enhance saccharification, and addition of water in two stages after which the jar is sealed before inoculation of quality seed vinegar and incubation at 28°–31° C.

However, all of the above known processes for producing ancient quality rice vinegar provide inconsistent results, are labor intensive and in general extremely time consuming. Furthermore, it has been found to be very difficult to repeatably obtain a finished product having a consistently strong and characteristic flavor, aroma and umami.

SUMMARY OF THE INVENTION

The present invention overcomes the disadvantages noted above and represents an automatic simplified process for the manufacture of rice wine and especially rice vinegar having the attributes of ancient jar prepared vinegar. A single autoclave vessel exposes rice substrate to a combination of high temperature and pressure, and is utilized to carry out the steps of washing, soaking, cooking, liquification and saccharification of partially polished or unpolished rice as well as ethanol fermentation of the rice wine mash to prepare a product having a high ethanol and high amino acid concentration.

The rice wine mash is imparted with a requisite unique flavor, aroma and umami by use of a koji which is prepared using a wheat substrate as the raw material instead of rice which is normally used to make koji for addition to the mash. Two strains of *Aspergillus oryzae*, fungus which are isolated from Hsao-Hsing wine cake and that have a high proteolytic activity and distinctly different aminopeptidase profiles, are grown on steamed wheat and utilized as a source of alpha-amylase, beta-amylase, proteases, lipases and nucleases. The distinctive profile of these two strains produces a mixture of short characteristic peptides which are responsible for the flavor, aroma and umami attributes.

Ethanol fermentation is carried out using two strains of Saccharomyces cerevisiae which are also isolated from the Hsao-Hsing wine cake. Intermittent agitation of the mash and yeast is maintained for seven days at 30° C.±10° C. until the ethanol concentration reaches about 18–20%, and the mash is then transferred to a second vessel for seven additional days and retained at a high temperature in the neighborhood of 30°–35° C. Intermittent agitation promotes autolysis of the yeast cells, interaction of the sediment and supernatant, and secondary fermentation and ripening.

Preferably, the rice is polished to a polishing ration of about 90% (i.e., 10% by weight of the rice is removed) in order to readily provide nutrients not only for the ethanol fermentation but also to provide substrates for the two strains of *Aspergillus oryzae* associated with the wheat-koji. Sufficient breakdown of the rice protein as well as the wheat protein from the koji is obtained by (1) omission of the addition of lactic acid or lactic acid bacteria in order to avoid strongly acidic conditions which would otherwise inhibit the activities of the koji-protease; and (2) avoidance of a physical-chemical interaction between the protein and starch gel which interferes with the enzymatic hydrolysis of protein, through removal of the gelatinized starch from the mash as quickly as possible through the addition of a second batch of alphaamylase ("post-sterilization") liquification) following the first batch of the same. Sterilization of the rice at high temperatures and with agitation, in combination with liquification of the rice by separate addition of two quantities of alphaamylase, ensures that the entire rice grain is substantially gelatinized before addition of wheat-koji and the yeast cultures. It must be emphasized, that wheat, instead of rice, is used in the koji preparation: the entire fermentation of the rice mash is carried out at a high temperature (approximately 30° C.) and not at the ordinary temperature of 15°–20° C. as in a sake mash or as in the Hsao-Hsing wine mash; and acetic acid, not lactic acid, that is contained in the vinegar is added to the mash at the time the mash is transferred to the second vessel to protect the mash, the latter of which now has a high amino acid content (greater than 1.0%), a high content of nucleotides, intensified umami, and a rich amber color combined with a very high yield (one kilogram of rice is converted to eight kilograms of rice vinegar). The high amino content ensures that the vinegar is exceptionally smooth and mild to the taste.

The autoclave fermentation vessel that is used for rice liquification, saccharification and ethanol fermentation includes two rotatable stirrers as well as a rotatable bottom member which carries elements that are complemental to the configuration of the bottom of the vessel and which scrape the bottom during rotation of the member. A plurality of inlet ports are arranged in a circular configuration on the bottom of the vessel for introduction of steam or air, and the vessel is also provided with a heat transferring jacket which spirals around the vessel and substantially surrounds the same. An upstanding, screened drain is located at the center of the vessel bottom and is enclosed within three upstanding legs that carry a bearing supporting a vertical shaft for rotation of the scraper member and agitators.

DETAILED DESCRIPTION OF THE DRAWINGS

Figure 1:
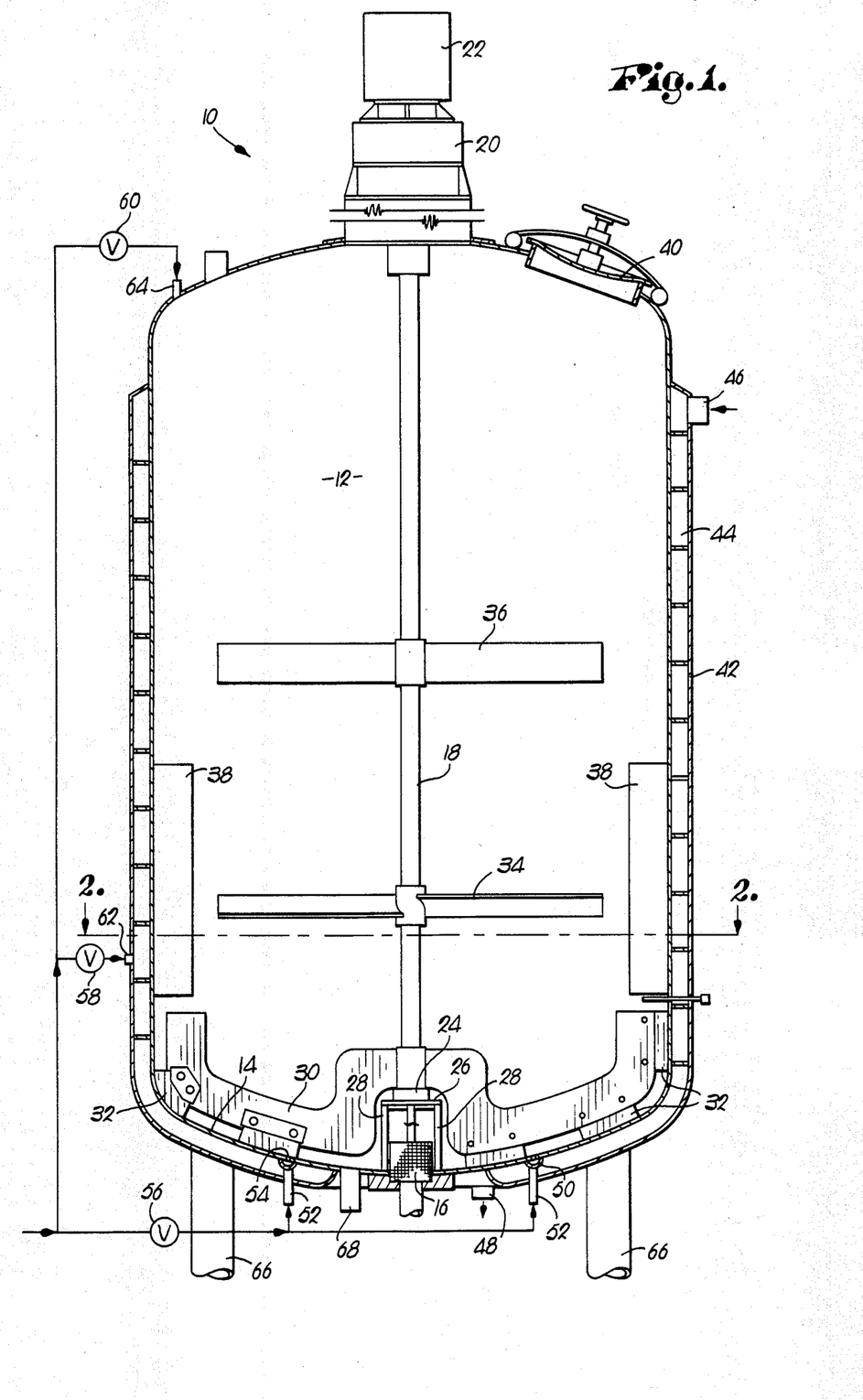
FIG. 1 is a side cross-sectional view of the fermentation vessel of the present invention used for production of ancient quality rice wine and particularly rice vinegar, illustrating a scraper member, agitators, spiral water jacket and inlet ports.
Figure 2:
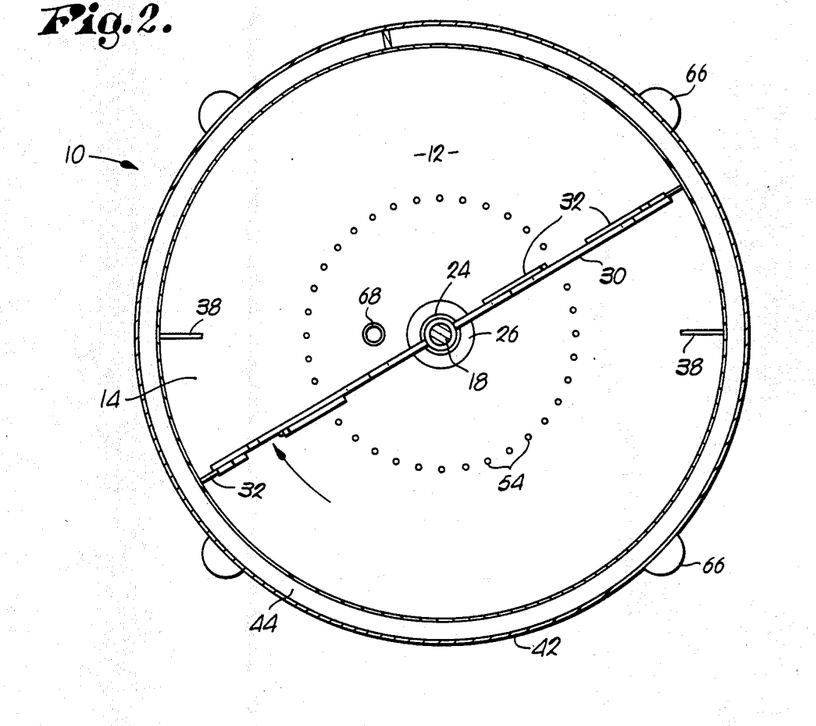
FIG. 2 is a horizontal sectional view taken along line 2—2 of FIG. 1 with an arrow illustrating the direction of rotation of the scraper member.

Referring initially to FIGS. 1 and 2, an autoclave fermentation vessel 10 is shown and is adapted for carrying out a substantial portion of the process steps for automated manufacture of rice wine and particularly rice vinegar described in more detail hereinbelow. The vessel 10 has structure defining a generally cylindrical chamber 12 having a smoothly curved bottom 14 that slopes downwardly toward a central, screened outlet 16.

A vertical shaft 18 is disposed along the center of chamber 12 and is rotatably driven at its upper end by a gear reducer 20 that is, in turn, powered by a motor 22. The shaft 18 is rotatably supported at its lower end by a collar 24 mounted atop a plate 26 which is carried by three upstanding legs 28 resting on the bottom 14 of chamber 12. The legs 28 are spaced around the periphery of the screened outlet 16 and are of a length to support the plate 26 in spaced relation to the same.

An elongated scraper member 30 is supported by the shaft 18 in adjacent relation to the vessel bottom 14 and is of a configuration generally complemental to the latter. The member 30 includes five outwardly extending, teflon coated elements 32 which scrape the bottom 14 of vessel 10 during rotation of the shaft 18. The scraper elements 32 are spaced along the length of member 30 and are positioned to sweep along the bottom 14 in a path which is between or directly adjacent the path swept by elements 32 on the opposite side of member 30 during rotation of the shaft 18.

Viewing FIG. 1, the shaft 18 also fixedly carries a first agitator 34 which is spaced above the member 30 and which includes pitched agitator elements. A second agitator 36 fixed to shaft 18 above first agitator 34 has two blades which are flat and oriented in an upright direction. Two upright vanes 38 are secured on opposite sides of chamber 12 to vessel 10 and are positioned horizontally across from the first agitator 34.

The vessel 10 is normally closed but includes an inlet hatch 40 for addition of materials to the chamber 12. The vessel also includes walls 42 which define a jacket adjacent the structure defining the chamber 12, and the jacket is of a spiral configuration substantially surrounding the chamber 12 for receiving a heat exchange medium therein and to thereby selectively raise or lower the temperature of any contents within the vessel 10. Heat exchange medium is received within the jacket 44 through an upper inlet 46 and is discharged from the jacket 44 through a port 48, as is shown in FIG. 1.

A manifold 50 is fixed to the vessel bottom 14 within the confines of the water jacket 44 and is coupled by pipes 52 to a source of steam and also a source of sterilized air. The manifold 50 has an annular configuration in horizontal section and a semi-circular shape in vertical section and functions to supply air or steam to a number of orifices which extend through the vessel bottom 14 and which are arranged in a circle, as is depicted in FIG. 2. A valve 56 regulates flow of air or steam to the manifold 50, while valves 58, 60 control the flow of air or steam to a side port 62 and a top port 64 respectively.

The vessel 10 is provided with four upstanding legs 66 (FIGS. 1 and 2). Additionally, an auxiliary drain 68 extends through the vessel bottom 14 in adjacent, offset relation to the centrally disposed screened outlet 16.

Figure 3:
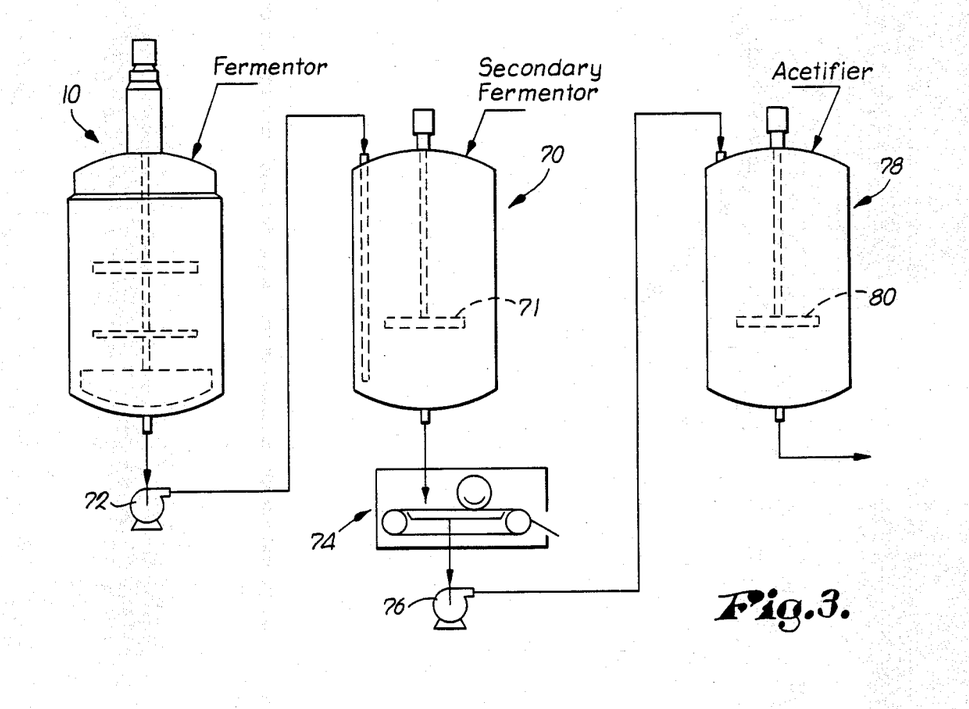
FIG. 3 is an essentially schematic representation of the fermentor of FIG. 1 along with a secondary fermentor, a pressing apparatus and an acetifier for practice of the method of the present invention in accordance with one preferred embodiment thereof.

In accordance with the principles of the present invention, a large scale, automated process for the manufacture of rice wine and especially rice vinegar having the attributes of ancient jar prepared vinegar encompasses the use of vessel 10 as a primary autoclave fermentor as well as a secondary fermentor 70 having a rotatable agitator 71 as illustrated schematically in FIG. 3. Contents of the vessel 10 are directed into the secondary fermentor 70 by a pump 72 having an inlet in communication with the screened outlet 16. The contents of the secondary fermentor 70 are discharged to a pressing apparatus 74, and the filtrate from apparatus 74 is directed by means of a pump 76 into an acetifier 78 which also includes a selectively rotatable stirrer or agitator 80.

The method of preparing the rice vinegar in accordance with the present invention begins by introducing into the vessel chamber 12 a quantity of rice which is preferably polished to a polishing ratio of about 90% and then blown by air to clean. The rice within chamber 12 is first washed, rinsed and then soaked in a quantity of water at room temperature for about an hour. Valve 56 is then opened to admit steam through the bottom 14 of vessel 10 in order to raise the temperature of the rice to about 78° C. to cook the rice and cause the rice starch to at least partially gelatinize.

Next, the quantity of alpha-amylase is added to the heated, cooked rice to cause liquification of the same. At the same time, motor 22 is actuated to rotate shaft 18 and cause scraper elements 32 to scrape bottom 14. A quantity of heat exchange medium, such as water, is introduced into jacket 44 through inlet 46 to maintain the temperature of the rice and first enzyme mixture at a level from about 70° C. to about 90° C., and preferably from about 78° C. to about 85° C. for about 40 minutes.

Valves 56, 58 and 60 are then opened to admit live steam to the chamber 12 and raise the temperature of the contents substantially, to a temperature in the range from about 115° C. to about 130° C., and peferably to a level on the order of about 120° C. The elevated temperature is maintained for about 20–25 minutes, and during this time scraper member 30 as well as agitators 34, 36 continue to rotate. The elevated temperature promotes a more complete gelatinization, liquification and sterilization of the mash.

Next, coolant water is introduced into the jacket 44 through inlet 46 to reduce the temperature of the mash slurry to a value in the range of about 70° C. to about 90° C., and preferably to about 85° C. At this time, a second batch of alpha-amylase, is added to the mash to carry out "post-steaming liquification" for an additional period of time such as 20 minutes. Temperature of the mash is maintained at about 70° C. to 90° C., and preferably at about 78° C. to about 85° C. and stirring by member 30 and agitators 34, 36 is continued. Addition of the second batch of alpha-amylase substantially improves the quality of the mash by degrading and liquifying the portion of the rice starch which was not gelatinized until exposure to cooking under the combination of high temperatures and pressures.

After about 20 minutes of "post-sterilization" liquification, the mash is cooled to about 45° C. and a quantity of koji prepared from wheat is added to the chamber 12. Agitation is continued in the vessel 10 and sterile air is introduced through the orifices 54 to aerate the mash and to further cool the same. The wheat-koji assists the saccharification process and provides the mash with a unique flavor, aroma and umami. Koji is preferred over the commercially available pure beta-amylase because the beta-amylases produced by the Aspergillus species are secreted slowly to degrade the oligosaccharides, which were previously produced by the degradation of rice starch by alphaamylase, in such a way to avoid accumulation of too much monomer or dimer. Therefore, the large amount (16% of the dry weight of the rice) of koji inoculum was prepared by solid fermentation and added directly as a solid to the semi-solid mash. This is the resemblance between the present invention and the ancient method of solid fermentation in a jar.

Once the mash has reached a temperature of about 30° C., a yeast culture preferably containing two strains of *Saccharamyces cerevisiae* is added to the mash and aeration and agitation is continued for about two hours. Subsequently, aeration is interrupted and the agitation is continued, first on a continuous basis and then on an intermittent basis for about seven days. On the seventh day of fermentation, the ethanol concentration in the mash is about 18%.

Next, the mash is transferred to the secondary fermentor 70 shown in FIG. 3 and exposed to intermittent mixing by agitator 71 while maintained at a temperature in the range of about 30° C. to about 35° C. On the fourteenth day of fermentation, a clear, particulate free upper layer of the mash within the secondary fermentator 70 is siphoned out and transferred to the acetifier 78. The remaining, lower regions of the mash are filtered through the press apparatus 74 to provide a filtrate which is then introduced into the acetifier 78 and combined with the clear supernatant.

The mash within acetifier 78 is preferably diluted four times to reduce the ethanol concentration to about 4.5%. An inoculum of Acetobacter is added to the mash in the form of pure culture or "seed vinegar" and fermentation is then carried out at a temperature in the range of about 28° C. to about 35° C., and preferably at about 30° C. Fermentation is interrupted when the residual ethanol content of the mash is reduced to about 0.1–0.3% by volume.

Naturally occuring lipids and amino acids in the rice have surface active characteristics and may cause foaming to occur. As a consequence, a mechanical foam separator may be installed at the upper portions of the acetifier 78 so that as the foam accumulates, the foam is directed into a chamber rotating at 1,000–1,500 rpm to break up the foam and separate the same into liquid and gas phases.

Before introducing the clear supernatant and mash filtrate into the acetifier 78, the supernatant and filtrate may be transferred to a sterilizer and pasteurized at about 60° C. for 20 to 30 minutes. Sterlization reduces the probability of contamination by, for instance, *Lactobacillus homohiochi* which could not only consume the ethanol but which would also encourage the growth of lactic acid bacteria that, in turn, would severely inhibit the acetic acid fermentation and impart an undesirable putrificative sour smell to the mash. A quantity of vinegar may be added to the stored solution to raise the total titratable acid to 1% for the storage.

The wheat koji is prepared by inoculating a first generation, stock culture of *Aspergillus oryzae* on dry bread to provide a second generation which is utilized to inoculate wheat grains for a third generation, or koji-seed. The koji-seed, in turn, is used to inoculate crushed wheat to produce the wheat koji, or fourth generation koji that is added to the mash. Use of wheat koji causes the mash to have a distinctive, characteristic flavor, aroma and umami.

As can be appreciated, the autoclave fermentator vessel 10, having scraper elements 32, can be used to automatically carry out most of the process steps of the present invention, including washing, soaking, steam cooking, liquification, pressure cooking and sterilization, "post-sterilization" liquification, cooling, saccharification and ethanol fermentation. Moreover, the process provides an ethanol concentration of at least 18% by volume, and as high as 22% by volume, which of course significantly increases the yield of the final vinegar product.

The relatively high ethanol concentration, in combination with a high density of yeast cells (at least $5 \times 10^8$ yeast cells/milliliter) causes autolyses of the yeast cells to be substantially complete, thereby enabling release of nucleic acid from inside the yeast cell which enhances the flavor of the vinegar. Moreover, the final amino acid content reaches a minimum of 1.0% which serves to increase the umami.

Ethanol fermentation at a relatively high temperature (approximately 30° C.) after the steps of liquification and saccharification of the mash substantially decreases the amount of energy that would otherwise be required for cooling the mash to, for instance, a temperature of 15°–20° C. which is normally associated with ethanol fermentation. Furthermore, fermentation at a relatively high temperature substantially decreases the time that is necessary for enabling the mash to reach an ethanol concentration of 18.0–20.0% within seven days. Rice-vinegar mash that is allowed to stand for an additional two or three months may be directly used, optionally, as a cooking wine.

The following examples are illustrative of the method of producing ancient quality rice vinegar in accordance with the present invention, and include the use of a semi-solid fermentation with a high content of starch in a single vessel that is small relative to the amount of substrate.

EXAMPLE 1

Preparation of the wheat-koji was undertaken by production of four koji generations. The first generation was prepared by growing *Aspergillus oryzae* stock cultures similar but not identical to American Type Culture Collection Strains (ATCC) #14895 and #14156, on malt-yeast extract agar until dark green spores were observed. The organisms were isolated from the Chinese Hsao-Hsing wine cake and additionally selected for their combined proteolytic and amylolytic enzymes. The stock cultures were maintained at 4° C. and transferred every three months onto fresh medium. Permanent stock cultures were maintained at 4° C. under sterile mineral oil, and left undisturbed.

The second generation of *Aspergillus oryzae*, (same strains as mentioned above), were grown on an induction medium consisting of dry, day-old wheat bread that was free of preservatives. The bread was initially prepared by placing the same in a dry area for one or two days, followed by removal of the crusts and cutting of the bread into cubes approximately one cm³ in size. Approximately 15 g of the dry bread cubes were placed in 250 ml screw cap flasks and autoclaved at 121° C. for 15 minutes. After autoclaving, the cubes were cooled to 40° C. and 5 ml of sterile, distilled water was pipetted along the walls of the flask in such a manner to avoid localization of the water. Subsequently, moisture in the flask was allowed to equilibrate at room temperature for one or two days. Next, the bread was inoculated with one loopful of spores from the first generation stock culture and incubated at 30° C. for five days. During the first two days of incubation, the cultures were shaken frequently in order to evenly distribute the spores onto each bread cube. Shaking is not essential during the remaining three days of incubaton. The incubation was continued until a growth of mycelium was observed and dark green spores had formed.

The koji seed, or third generation, was prepared by placing grains of wheat on a stainless steel basket and lightly spraying the grains with water. Alternatively, grains may be placed on a bamboo tray. The moisture was allowed to reach an equilibrium, which took approximately three or four hours, and the grains were then crushed with a roll mill into two to four pieces in such a manner as to avoid formation of grain powder. Next, the grain was returned to the basket and water again added until the moisture content of the crushed grain reached 35±2 or 3%. The basket was then placed into a steamer or autoclave and steamed for 40–60 minutes. At the end of the steaming process, the moisture content of the grain was 35–38% which is critical for successful preparation of the koji seed. Next, the prepared wheat was inoculated with cultures from the second generation induction medium, in a ratio of 3% by weight of inoculum (with each strain of the *Aspergillus oryzae* contributing 1.5%) to 100% of the dry weight of wheat. That is, the ratio of wet wheat to inoculum was 13.5–13.8 kg wet wheat to 15 g of each strain of Aspergillus culture from the second generation induction medium.

To complete preparation of the koji seed for a third generation, the inoculated, steamed wheat was piled into a cone shape, the height of which was between 15–20 cm. The temperature of the wheat was maintained at a minimum of 30°–35° C. but as the mycelium penetrated the grains of wheat, the temperature of the wheat rose to about 38° C. at which time the cone was spread out to reduce the temperature to about 30°–35° C. Once the temperature was below 35° C., the culture was repiled onto the aforementioned cone shape and monitored until the temperature again rose to 38° C. Following the second rise in temperature of the wheat, the culture was distributed onto flat wooden trays which may optionally be made of bamboo. The bottom of the tray allowed for free flow of air, and the thickness of the wheat layer did not exceed 5 cm in order to avoid overheating of the wheat and eventual death of the fungal organism. The koji seed, or third generation, was allowed to grow in an environment of high humidity and high moisture for 50–60 hours, until every grain contained about $8 \times 10^8$ spores. Following the period of growth, the koji seed was removed from the tray and allowed to dry for two or three days and then stored in an air-tight container at 4° C. or less. Known, automatic koji fermenters which control temperature and humidity may be used during production of the koji seed, such as fermenters manufactured by Yaegaki Brewing Machinery Company, Ltd. of Hyogo, Japan and Fujiwara Brewing Machinery Company, Ltd. of Okayama City, Japan.

The actual wheat koji, comprising the fourth generation, was prepared in a manner similar to preparation of the third generation or koji seed except that instead of inoculating wheat from the second generation, induction medium, the koji seed or third generation was used as an inoculum to prepare the fourth generation. The third generation koji seed was added at a proportion of 0.3–0.5% of the original, dry weight of the wheat, and therefore each steamed, crushed wheat particle contained a mimimum of $2 \times 10^3$ spores. During incubation of the fourth generation, the temperature was kept below 36° C. and the incubation period was shortened to 48–56 hours to minimize odor. Moreover, the fourth generation, wheat koji was not dried, but was utilized immediately, since enzymes such as amylase and protease, which are maximized by this process, are not very stable under storage conditions.

It has been found that the following qualities and properties are desirable for wheat koji: (1) a moisture content of 21.8–28.5%, with an optimum moisture content being 25.2%; (2) total titratable acid of 38–60 ml of 0.1 N NaOH per gram of wheat koji; (3) alpha and beta-amylase in order to produce 300–400 mg of glucose/hour/gram of wheat koji; (4) acidic protease that is able to produce 1800–2000 micrograms of glycine/hour/gram of wheat koji; (5) a light greenish-yellow color; (6) no sour smell or unpleasant odor; (7) a sweet to semi-sweet taste with no sour or bitter taste; and (8) a loose but flexible texture.

The two strains of *Aspergillus oryzae*, which were isolated from the Hsao-Hsing wine cake and which have high proteolytic activities and distinctly different aminopeptidase profiles, provide a source of alpha-amylase, beta-amylasde, proteases, lipases, and nucleases. The distinctive profiles of these two strains provide a mixture of short characteristic peptides which are responsible for the characteristic flavor, aroma and umami of the mash and a typical profile of the mixed culture is shown in FIG. 1.

FIG. 1
PROTEOLYTIC ACTIVITIES OF TWO STRAINS
OF ASPERGILLUS ORYZAE AS DETERMINED
BY AMINOPEPTIDASE ACTIVITY

| AMINOPEPTIDASES (amino acid-$\beta$-naphtylamine) | RELATIVE FLUORESCENT INTENSITY |
|---|---|
| L-arginyl-$\beta$-NA | >100 |
| L-$\alpha$-aspartyl-$\beta$-NA | 81 |
| L-glycyl-$\beta$-NA | 62 |
| L-$\alpha$-glutamyl-$\beta$-NA | >100 |
| L-histidyl-$\beta$-NA | >100 |
| L-hydroxyl-prolyl-$\beta$-NA | 63 |
| L-isoleucyl-$\beta$-NA | >100 |
| L-leucyl-$\beta$-NA | >100 |
| L-methionyl-$\beta$-NA | 98 |
| L-phenyl-alenyl-$\beta$-NA | >100 |
| L-prolyl-$\beta$-N | 87 |
| L-threonyl-$\beta$-NA | >100 |
| L-tyrosyl-$\beta$-NA | >100 |
| L-valyl-$\beta$-NA | 72 |

The extra-cellular proteases activities were determined through amino-peptidase assay. The 19 substrates were L-amino acid beta-naphthylamides (AA-NA), nonfluorescent compounds, that were hydrolyzed to the highly fluorescent end product betanaphthylamine. Fluorometric determinations of the end product were used to obtain maximum sensitivity.

Tris buffer base and the amino acid betanaphthylamides (AA-NA) were dissolved in 0.1 M Tris acetate buffer, pH 8.0, to provide a final concentration of $10^{-4}$ M. After autoclave sterilization, the substrates were stored at 6°-8° C.

For the aminopeptidase activity assay, two ml of each of the AA-NA substrates were placed into individual round glass cuvettes (10×75 mm) and held in an ice bath. The substrates were inoculated with 0.1 ml of crude enzyme preparation. These reaction mixtures were incubated in a 37° C. circulating water bath for 1 hour followed by heating in a 56° C. water bath for 10 minutes to stop the reactions. The substrates were then cooled in an ice bath for not less than 15 minutes and remained in the ice bath durin fluorescent assay. A set of AA-NA blanks inoculated with sterile saline was analyzed in parallel, and the results subtracted from the samples. The relative fluorescent intensity (RFI) was determined using an Aminco Bowman Fluoromicrophotometer fitted with a Corning 7-37 (365 nm) primary filter and a Wratten 47-B secondary filter (415 nm). The reaction mixture having a volume of 2.10 ml contained L-amino acid betanaphthylamide, Tris acetate buffer, and NaCl in the concentrations of $10^{-4}$ M, $10^{-1}$ M, and $7.7\times10^{-3}$ M, respectively. With these conditions, an increase of 0.63 RFI in the reaction mixture is equivalent to one enzyme unit.

In order to prepare the yeast inoculum, four strains of Saccharamyces cerevisiae stock cultures, similar to but not identical to ATCC #26607, ATCC #26608, ATCC #26609, ATCC #26610 and ATCC #26611, were grown on malt-yeast extract agar, and stored at 4° C. and transferred every three months onto fresh medium. Permanent stock cultures were maintained under sterile mineral oil, stored at 4° C. and left undisturbed. In order to increase the cell density of the yeast prior to inoculation of the mash, a loopful of the stock cultures was transferred to individual shaker flasks containing 40 ml of the growth medium that was autoclaved prior to utilization. One liter of the growth medium consisted of 150 grams of granulated sugar, 15 grams of molasses, two grams of ammonium sulfate, one gram of potassium phosphate, and one gram of yeast extract. The cultures were allowed to grow overnight at 30° C., and then were transferred to a fermenter containing the same medium at 30° C., with sufficient agitation and aeration such that the density of the cells reached a minimum of $5\times10^8$ cells/ml and as much as $2\times10^9$ cells/ml. The physiological state of the yeast cells was such that ethanol fermentation was detected. Following the growth period, the culture was harvested and stored at 4° C. for subsequent use during the ethanol fermentation process.

For production of the rice vinegar mash having a high ethanol and a high amino acid concentration, 700 kg. of short grain rice with a polishing ratio of 90%, which was cleaned by an air blowing process, was washed in a fermentation vessel similar to vessel 10 of FIGS. 1 and 2 having an inner diameter of 135 cm and an overall height of approximately 421 cm to yield an internal volume sufficient to contain approximately 2,000 liters of mash. The rice was then soaked in 1050 liters of water in the closed, air-tight fermenter 10 at room temperature for about one hour. Orifices 54 in the chamber bottom 14 were of a diameter of approximately one-half of the normal diameter of the rice grain to prevent escape of the latter.

Following soaking of the rice, live steam was introduced through the orifices 54 to rapidly raise the temperature of the rice and water to 78° C. which was accomplished in about 25 minutes. At that time, partial gelatinization of the rice was observed. After the temperature of the rice and water reached 78° C., 1400 g (or 0.2% of the dry weight of the rice) of alpha-amylase was added for liquification. The alpha-amylase used is sold under the trade name "Ueda-Ekka-Koso" by Ueda Chemical Industries, Osaka-Fu, Japan. Effort was made to keep the temperature of the rice slurry in the range of 78°-85° C. for 40 minutes, and during this time, the slurry was continuously stirred by scraper member 30 and agitator members 34, 36 which were rotated at a speed of 120 rpm.

At this time, the rice and water mixture was observed to be converted into a well-liquified slurry, and the temperature inside the vessel 10 was again raised with steam introduced through orifices 54 to increase the temperature of the contents to 121° C. The slurry was maintained for 20-25 minutes at the elevated temperature of 121° C., with continuous stirring by the scraper member 30 and agitators 34, 36 at a speed of 60 to 180 rpm. Raising the temperature of the slurry to 121° C. caused a more complete gelatinization and liquification of the rice to occur, along with sterilization.

Subsequently, cooling water was introduced through the jacket inlet 46 for 45 minutes to rapidly cool the slurry to a temperature of 85° C. The flow of coolant water was interrupted and a second batch of alpha-amylase was added which was identical to the aforementioned, first batch of alpha-amylase. 700 g of alpha-amylase, equivalent to 0.1% of the dry weight of the rice, was added to the slurry to carry out the "post-sterilization" liquification for a period of 20 minutes. Continuous stirring by the scraper member 30 and agitators 34, 36 was maintained during the period of post-steaming liquification, and effort was made to keep the temperature of the slurry within the range of approximately 78°–85° C. Subsequently, the rice vinegar mash exhibited an excellent fluidity and was rapidly cooled to 45° C. within 1.0–1.5 hours. Next, 105–112 kg (or 15–16% of the dry weight of the rice) of the fourth generation wheat koji was added to the fermenter vessel 10. Agitation by the member 30 and agitators 34, 36 was continued and also sterile air was introduced through the orifices 54 to rapidly cool the mash to 30° C. in 90 minutes. Once the mash reached the temperature of 30° C. (which is an ideal temperature for inoculation of the starting yeast culture) 70 liters of culture was added to the mash having a minimum of $5 \times 10^8$ yeast cells/ml (which is equivalent to $1.75 \times 10^7$ yeast cells/m following dilution of the yeast into 2,000 liters of contents of the vessel 10) to a maximum of $2 \times 10^9$ cells/ml (equivalent to $7 \times 10^7$ cells/ml following dilution). Importantly, aeration (air saturation) of the mash was continued during introduction of the starting yeast culture to enable the yeast cells to enter exponential phase and to multiply at an exponential growth rate.

Once the mash was inoculated with both the wheat koji and the yeast starter, agitation and aeration was continued for 2 hours. Subsequently, aeration was stopped while agitation was continued for an additional two hour period. Next, intermittent agitation, again with no aeration, was carried out for five minutes every four hours for seven days and the temperature of the mash was consistantly maintained at 30° C.±1° C.

Subsequently, the mash was transferred to the secondary fermenter 70 and exposed to intermittent agitation, without aeration, for five minutes every twelve hours for seven additional days at 30°–35° C. After the fourteenth day of the fermentation process, the constituents of the rice vinegar mash were as follows: (1) ethanol concentration of greater than 18.0%; (2) total titratable acid of 96 ml of 0.1 N NaOH per 100 ml of mash; and (3) a total amino acid content (expressed as glycine equivalents) of greater than 1.0%.

The mash that reached 18% ethanol concentration during the first seven days of fermentation and followed by secondary fermentation for an additional seven days, was observed to be clear and free of particulates in the upper ⅓ of the mash. At this time, the mash was siphoned out of the secondary fermentor 70 and transferred to the acetifier 78, where it was diluted four times and acetification was carried out. The remaining ⅔, lower portion of the mash, was processed through the pressing apparatus 74, and the filtrate was then combined with any remaining clear supernatant not transferred to acetifier 78, and then directed to a sterilizer for pasteurization at 60° C. for 20–30 minutes and storage. The rice vinegar mash was stored in the same sterilizer following pasteurization to avoid contamination by, for instance, *Lactobacillus homohiochi* which would not only consume the ethanol but would also encourage the growth of lactic acid bacteria. An adequate amount of vinegar was added to the stored mash to raise the total titratable acid content to 1.0% and the mash was later transferred to the acetifier 78 to carry out the acetification process as outlined above with regard to the clear upper ⅓ supernatant of the fourteen day old mash.

The final step of manufacturing the vinegar included the process of acetification, which is oxidation of the ethanol by Acetobacter to produce acetic acid. Acetification occured in the acetifier vessel 78 which is available from Heinrach Frings GmbH and Company; Bonn, Germany. The filtrate was diluted in the acetifier 78 four times to present an ethanol concentration of 4.5% by volume.

The strain of Acetobacter that was utilized during the process is known for use with commercial vinegar production in Taiwan, and is an organism with characteristics similar but not identical to *Acetobacter aceti* subspecies accti (ATCC #15973). To initrate the process, a large inoculum of Acetobacter was added in the form of pure culture or "seed vinegar". The fermentation was carried out at 30° C., and in order to avoid over-oxidation of each batch, the acetification was terminated when the residual ethanol was reduced to 0.1–0.3% by volume. At that time, approximately one-half of the fermentation contents were pumped out and replaced with fresh material.

A mechanical foam separator fitted to the top of acetifier 78 was found to be particularly advantageous in controlling foam within acetifier 78. A separator had a rotary chamber exposing the foam to rotational speeds of 1,000–1,500 rpm which was successful in separating the foam into liquid and gas phases.

The resultant vinegar had the characteristic flavor, aroma and umami of ancient quality jar prepared vinegar, and was very smooth and mild due to the relatively high concentration of amino acids.

EXAMPLE 2

The procedure of Example 1 is repeated except that medium polished, glutinous rice ("waxy rice") is used.

EXAMPLE 3

The procedure of Example 1 is again repeated except that the rice is comprised of medium polished, long grain rice.

EXAMPLE 4

The procedure of Example 1 is again repeated except that unpolished, short, long or glutinous rice ("waxy rice") is utilized.

EXAMPLE 5

The procedure of Example 1 is again repeated except that the wheat koji is produced by a strain of *Aspergillus oryzae* such as ATCC #7561 or ATCC #9102, that produces minute amounts of protease so that the resulting mash can be utilized directly as a rice wine immediately following secondary fermentation, aging, filtration, and Pasteurization. In addition, the polishing-ratio of the rice is increased to 50–80%.

EXAMPLE 6

The process of Example 1 is again repeated and the process of Example 5 is also repeated. The vinegar obtained from Example 1 and the wine that is obtained from Example 5 are then combined in different ratios such as 1:1, 1:2, or 1:3. The combined aliquot can be directly consumed or diluted with pickled passion fruits, pickled apples and other pickled or fresh fruits or diluted with fruit juices for consumption as a drink.

EXAMPLE 7

The procedure of Example 1 is again repeated except that a strain of *Rhizopus formosaensis* similar but not identical to ATCC #26612 is used to replace *Aspergillus oryzae* for the purpose of producing the wheat koji.

EXAMPLE 8

The procedure of Example 1 is again repeated except that a strain of *Rhizopus japonicus* similar but not identical to ATCC #24863 is used to replace *Aspergillus oryzae* for the purpose of producing the wheat koji.

EXAMPLE 9

The procedure of Example 1 is again repeated except that a strain of *Monascus anka* similar but not identical to ATCC #16360, ATCC #16379, ATCC #16435, or ATCC #16437 is used to replace *Aspergillus oryzae* for the purpose of producing the wheat koji.

EXAMPLE 10

The procedure of Example 1 is again repeated except that two or more strains from the group of *Rhizopus formosaensis, Rhizopus japonicus,* and *Monascus anka* as set forth in Examples 8, 9 and 10 are used in combination to replace *Aspergillus oryzae* for the purpose of producing the wheat koji.

I claim:

1. A large scale, semi-solid fermentation process for the manufacture of ancient quality rice vinegar or rice wine product comprising the steps of:

soaking a quantity of washed rice in water;

cooking and gelatinizing the rice by direct contact with live steam;

preparing a rice-wine mash with a starch content of at least about 30% by mixing the cooked rice with a first addition of an enzyme which will liquify the rice, maintaining the temperature of the rice-enzyme mixture at a level from about 70° C. to about 90° C. to liquify and gelatinize the rice;

increasing the temperature of the mixture to at least about 115° C. to 130° C. for a time period to effect additional gelatinization, liquification, and sterilization of the rice, cooling the mixture to a temperature in the range of about 70° C. to 90° C.; and mixing a second addition of enzyme with the mixture to effect post-sterilization liquification of the rice with the starch content thereof remaining at least about 30%;

inoculating a quantity of wheat substrate with a fungus that will convert at least a part of the substrate to flavor enhancing peptides and to thereby produce a wheat-koji;

adding a quantity of said wheat-koji to said rice-wine mash to impart a unique aroma, flavor and umami to said mash; and adding a *Saccharomyces cerevisiae* yeast culture to the mash to effect fermentation thereof;

continuing fermentation of the mash with said yeast in the presence of the wheat-koji until an ethanol content of at least abut 18% is obtained whereby flavor enhancing peptides produced by fungal conversion of the rice and fermentation products of the rice further augment the unique aroma, flavor and umami imparted to the final product.

2. The process as set forth in claim 1, wherein said step of soaking, cooking and sterilizing said rice, preparing said rice-vinegar mash, adding said wheat-koji with said mash, and combining a yeast culture with said mash to produce a rice wine that contains at least about 18% ethanol is undertaken in a single vessel.

3. The process as set forth in claim 2; including the step of continuously scraping the bottom of said vessel for a period of time sufficient to promote the heating and cooling processes as well as liquification, gelatinization and saccharification of said rice that is a semi-solid slurry; and thereafter the step of intermittent scraping of said vessel bottom to additionally promote ethanol fermentation in the mash for about 7 days to reach a minimum of about 18% ethanol to maximize autolysis of the yeast.

4. The process as set forth in claim 2, wherein said vessel is closed.

5. The process as set forth in claim 2, including the step of transferring said mash to a second vessel for secondary fermentation which promotes autolysis of the yeast cells.

6. The process as set forth in claim 5, including the step of adding acetic acid to said mash at approximately the time that said mash is transferred to said second vessel or transferred for storage.

7. The process as set forth in claim 2; including the steps of aerating, agitating and scraping said vessel during at least a portion of the time that said mash is fermenting.

8. The process as set forth in claim 1, wherein said first enzyme is alpha-amylase.

9. The process as set forth in claim 8, wherein said second enzyme is alpha-amylase and said step of increasing the temperature of said mixture and then cooling said mixture occurs immediately befor said step of mixing said second addition of enzyme with said mixture.

10. The process as set forth in claim 8, wherein said step of preparing said rice-vinegar mash includes the step of introducing superheated steam under pressure to said mash for a more complete gelatinization, liquidfication, and sterilization.

11. The process as set forth in claim 10, wherein said step of preparing said mash further includes agitating and scraping said mash.

12. The process as set forth in claim 1, wherein said step of ethanol fermentation is carried out at a temperature of about 30° C. for about seven days; and secondary fermentation is then carried out for an additional period of about seven days at a temperature in the range of about 30° C. to 35° C.

13. The process as set forth in claim 1, wherein said wheat koji is produced by adding at least one strain of *Aspergillus oryzae* to produce minute amounts of protease so that the resulting mash can be utilized directly as a rice wine immediately following a step of secondary fermentation, aging, filtration, and pasteurization.

14. The process as set forth in claim 13, wherein the rice has a polishing ration in the range of about 50% to about 80%.

15. The process as set forth in claim 1, including the step of oxidizing said ethanol to yield rice-vinegar.

16. The process as set forth in claim 1; including the step of innoculating a quantity of wheat substrate with a fungus that will convert at least a part of the substrate to flavor enhancing peptides and to thereby produce a wheat koji.

17. The process as set forth in claim 1; including the step of mixing said rice wine with fruit juice for consumption as a condiment or as a beverage.

18. The process as set forth in claim 17, wherein said fruit juice is pickled.

19. The process as set forth in claim 1; including the steps of oxiding said ethanol in a first portion of said wine to yield rice-vinegar; and mixing said rice-vinegar with a second portion of said rice wine; and mixing the rice-vinegar and rice wine with fruit juice for consumption as a condiment or as a beverage.

20. The process as set forth in claim 19, wherein said fruit juice is pickled.

21. The process as set forth in claim 1, wherein said enzyme is alpha-amylase.

22. The process as set forth in claim 1, wherein said fungus is *Aspergillus oryzae*.

23. The process as set forth in claim 22, wherein at least two separate *Aspergillus oryzae* fungi are added to the wheat substrate.

24. The process as set forth in claim 1, wherein said fungus is *Rhizopus formosaensis*.

25. The process as set forth in claim 1, wherein said fungus is *Rhizopus japonicus*.

26. The process as set forth in claim 1, wherein said fungus is *Monascus anka*.

27. The process as set forth in claim 1, wherein at least two separate strains of *Saccharomyces cerevisiae* yeast culture are added to the mash.

28. A large scale, semi-solid fermentation process for the manufacture of an ancient quality rice wine or rice vinegar product comprising the steps of:
cooking a quantity of washed rice by direct contact with live steam;
preparing a rice-vinegar mash with a starch content of at least about 30% by
mixing the cooked rice mash with an enzyme which will gelatinize and liquid the rice, and
maintaining the temperature of the rice mash and enzyme mixture at a level from about 70° C. to about 90° C. to liquify and gelatinize the rice with the starch content thereof remaining at least about 30%;
inoculating a quantity of wheat substrate with a fungus that will convert at least a part of the substrate to flavor enhancing peptides and to thereby produce a wheat-koji;
mixing said wheat-koji with said rice-vinegar mash to impart a unique aroma, flavor and umami to said mash;
adding a *Saccharomyces cerevisiae* yeast culture to the mash to ferment the mash;
continuing fermentation of the mash with said yeast in the presence of the wheat-koji until an ethanol content of at least about 18% is obtained whereby flavor enhancing peptides produced by fungal conversion of the rice and fermentation products of the yeast further augment the unique aroma, flavor and umami of the final product.

29. The process as set forth in claim 28, wherein said process is undertaken in a single vessel.

30. The process as set forth in claim 29, including the step of continuously scraping the bottom of said vessel for a period of time sufficient to promote the heating and cooling well as liquification, gelatinization, and saccharification of said rice; and thereafter the step of intermittent scraping of said vessel bottom to additionally promote ethanol fermentation in the mash for about 7 days to reach a minimum of about 18% ethanol.

31. The process as set forth in claim 28, including the step of oxidizing said ethanol in the rice-wine to yield the acetic acid in the rice-vinegar.

32. The process as set forth in claim 31; wherein said step of oxidizing said ethanol is carried out at a temperature in the range of from about 28° C. to about 35° C.

33. The process as set forth in claim 28; including the steps of raising the temperature of the rice mash to a level of above about 115° C. and subsequently cooling the mash to a level below about 90° C.; and immediately thereafter adding said enzyme to the mash to carry out post-sterilization liquification and gelatinization.

34. The process as set forth in claim 28; including the step of mixing said rice wine with fruit juice for comsuption as a condiment or as a beverage.

35. The process as set forth in claim 34 wherein said fruit juice is pickled.

36. The process as set forth in claim 28; including the steps of oxiding said ethanol in a first portion of said wine to yield rice-vinegar; and mixing said rice-vinegar with a second portion of said rice wine; and mixing the rice-vinegar and rice wine with fruit juice for consumption as a condiment or as a beverage.

37. A large scale, semi-solid fermentation process for the manufacture of an ancient quality rice wine or rice vinegar product comprising the steps of:
cooking by steaming a quantity of washed, at least partially gelatinized rice
preparing a rice-vinegar mash with a starch content of at least about 30% by
mixing the cooked rice mash with an enzyme which will liquify the rice, and
maintaining the temperature of the rice mash and enzyme mixture at a level to effect liquification of the rice with the starch content thereof retaining at least about 30%;
inoculating a quantity of wheat substrate with a fungus that will convert at least a part of the substrate to flavor enhancing peptides and to thereby produce wheat-koji;
adding a quantity of said wheat-koji to said rice-vinegar mash to impart a unique aroma, flavor and umami to said mash;
adding a *Saccharomyces cerevisiae* yeast culture to said mash to effect fermentation thereof; and
continuing the fermentation of the mash with said yeast culture in the presence of the wheat-koji until an ethanol content of at least about 18% is obtained whereby flavor enhancing peptides produced by fungal conversion of rice and fermentation products of the rice further augment the unique aroma, flavor and umami imparted to the final product.

* * * * *